United States Patent [19]
Rupp

[11] Patent Number: 5,242,125
[45] Date of Patent: Sep. 7, 1993

[54] PORTABLE SNOW CONE MAKER

[76] Inventor: Carl A. Rupp, 360 W. Whitney Ave., Salt Lake City, Utah 84115

[21] Appl. No.: 6,764

[22] Filed: Jan. 21, 1993

[51] Int. Cl.$^5$ ............................................... B02C 19/12
[52] U.S. Cl. ............................. 241/93; 241/DIG. 17
[58] Field of Search ............... 241/93, 100, 167, 169.1, 241/DIG. 17; 99/537, 623, 510

[56] References Cited

U.S. PATENT DOCUMENTS

| | | | |
|---|---|---|---|
| 1,992,783 | 2/1935 | Smith . | |
| 2,396,085 | 3/1946 | Clifton | 241/93 |
| 2,565,226 | 8/1951 | Gross, Jr. . | |
| 2,655,318 | 10/1953 | Beyer . | |
| 2,684,207 | 7/1954 | O'Brien . | |
| 4,390,133 | 6/1983 | Warnat | 241/93 |
| 4,856,718 | 8/1989 | Gaber et al. | 241/93 |
| 4,884,755 | 12/1989 | Hedrington | 241/93 X |
| 5,050,809 | 9/1991 | Rupp . | |

*Primary Examiner*—Douglas D. Watts
*Attorney, Agent, or Firm*—M. Reid Russell

[57] ABSTRACT

A portable snow cone maker that includes a housing with a mounting plate arranged to receive studs that extend at right angles outwardly from a drive shaft end of an electric motor, the studs fitted through holes in the mounting plate with nuts turned thereover to mount the motor within the housing, which housing mounting plate is open to accommodate the drive shaft fitted therethrough. An ice cube shaving blade, that is a metal band connected at its ends and is slotted laterally at spaced intervals therearound with an edge of each slot elevated to form an ice shaving scoop that shaves ice off of an ice cube that is urged against the blade top surface, the shavings to pass through the blade slots. The blade is mounted to extend outwardly from a blade mount that includes a collar for mounting to the drive shaft. A combination hopper and chute, wherethrough ice cubes are urged by a plunger to engage the turning blade top surface, and a discharge chute mounted to the chute lower end, is for fitting onto the motor studs that receive nuts turned thereover completing the invention assembly. The ice shaving blade turns within the discharge chute through slots formed in a cylindrical section of the discharge chute, one slot the blade turns into functioning as a wiper for removing ice shaving as have passed through the blade slots and directs those shavings along a curved face of which discharge chute cylindrical section into a vessel positioned therebelow.

9 Claims, 2 Drawing Sheets

PORTABLE SNOW CONE MAKER

BACKGROUND OF THE INVENTION

1. Field of the Invention

This invention relates to machines for making shaved ice confectioneries and in particular to an electric motor driven compact portable shaved ice machine that is suitable for home use.

2. Prior Art

Shaved ice particles have long been used in the manufacture of deserts and confectioneries. Commonly, such shavings are collected in a holder and a syrup of a desired flavor, or combination of flavors is poured over the shaved ice to provide sweetening to a desired taste.

In the past, a great many devices have been proposed to provide the desired ice chips or ice shavings. Hand held and motor operated devices have been used for many years for providing such ice chips or shavings. Such devices generally include a holder for a knife blade that is drawn across a large block of ice or in some instances, larger, bulkier, devices have been used to crush the larger blocks of ice. More recently, machines have been developed that allow a block of ice to be held in a fixed position while automatically operated cutter blades are pulled across a block surface to produce ice shavings. The ice shavings are then collected and are thereafter scooped into a container and receive a sweet syrup poured thereover.

Blocks of ice are not always available, nor are such practical for use in a portable ice shaving machine suitable for in home use like that of the invention. As a result, there is a need for a machine to make ice chips or shavings from smaller cubes such as are commonly produced by common household refrigerators and freezers. The present invention provides such a portable ice shaving machine that is light in weight and will produce uniform ice shavings from ice cubes that has a snow like consistency and is desirable for receiving a flavored sweet syrup poured thereover as a desert item.

U.S. Pat. Nos. 1,992,783, 2,565,226, 2,684,207 and 2,655,318, show machines that are useful for shaving cubes of ice, and an earlier patent issued to the present inventor, U.S. Pat. No. 5,050,809, shows an ice cube shaving machine and syrup dispensing arrangement for use in a store or snow cone stand type operation. Like the '809 patent, the present machine provides a hopper for receiving ice cubes placed therein and for urging each cube, in turn, against a turning blade assembly that is rotated by an electric motor, the turning blade shaving ice from a cube surface to form ice shavings with a snow like consistence. Additional to the differences in the housing, electric drive motor and ring shaped blade between the '809 patent and the present invention, the present invention provides a unique combination hopper, chute and dispenser chute with blade scraper assembly for directing the ice shavings into a cup or vessel therebelow.

SUMMARY OF THE INVENTION

Objects of the Invention

It is a principal object of the present invention to provide a compact light weight portable machine for removing ice shavings off from cubes of ice, that includes a combination hopper, chute and dispenser chute with a blade scraper arrangement for directing ice shavings into a cup or vessel.

Another object is to provide a cube ice shaver that is light in weight so as to be portable, that is simple and safe to use and is relatively immune to damage from water produced by melting ice and shaved ice.

Still another object of the present invention is to provide, as a single component, an ice cube hopper with a chute that terminates in is a discharge chute that includes a blade scrapper and a curved ice shavings dispensing face.

Still another object of the present invention is to provide a compact, light weight portable machine that is easily and conveniently maintained and is suitable for safe use by even a very young person.

Features of the Invention

Principal features of the invention include a light weight housing wherein an electric motor is mounted. A drive shaft of the electric motor extends from the housing and mounts a continuous ring shaped ice shaving blade on the drive shaft end. The ring shaped blade is turned through a discharge chute end of a combination ice cube hopper, chute and discharge chute wherein the ice shaving blade turns. The hopper provides for directing a column of ice cubes into the chute that directs the ice cubes against a top surface of the turning ice shaving blade, turning within the discharge shoot. The ice shaving blade includes scoops formed in its top surface that each scrape a shaving of ice off from the surface of the ice curve resting on the blade top surface, that shaving passing through an adjacent lateral slot in which blade adjacent to each scoop and onto a sloping face of the discharge chute. The ice shaving blade turns through aligned slots through the discharge chute body, the downstream slot to function as a wiper for removing shaved ice off from the blade inner surface and directing that shaved ice along the sloping face and to a receiver positioned below the discharge chute sloping face bottom end.

Other objects and features of the invention will become apparent from the following detailed description and drawings disclosing what are presently contemplated as being the best modes of the invention.

THE DRAWINGS

Figures 1, 1A, 2:
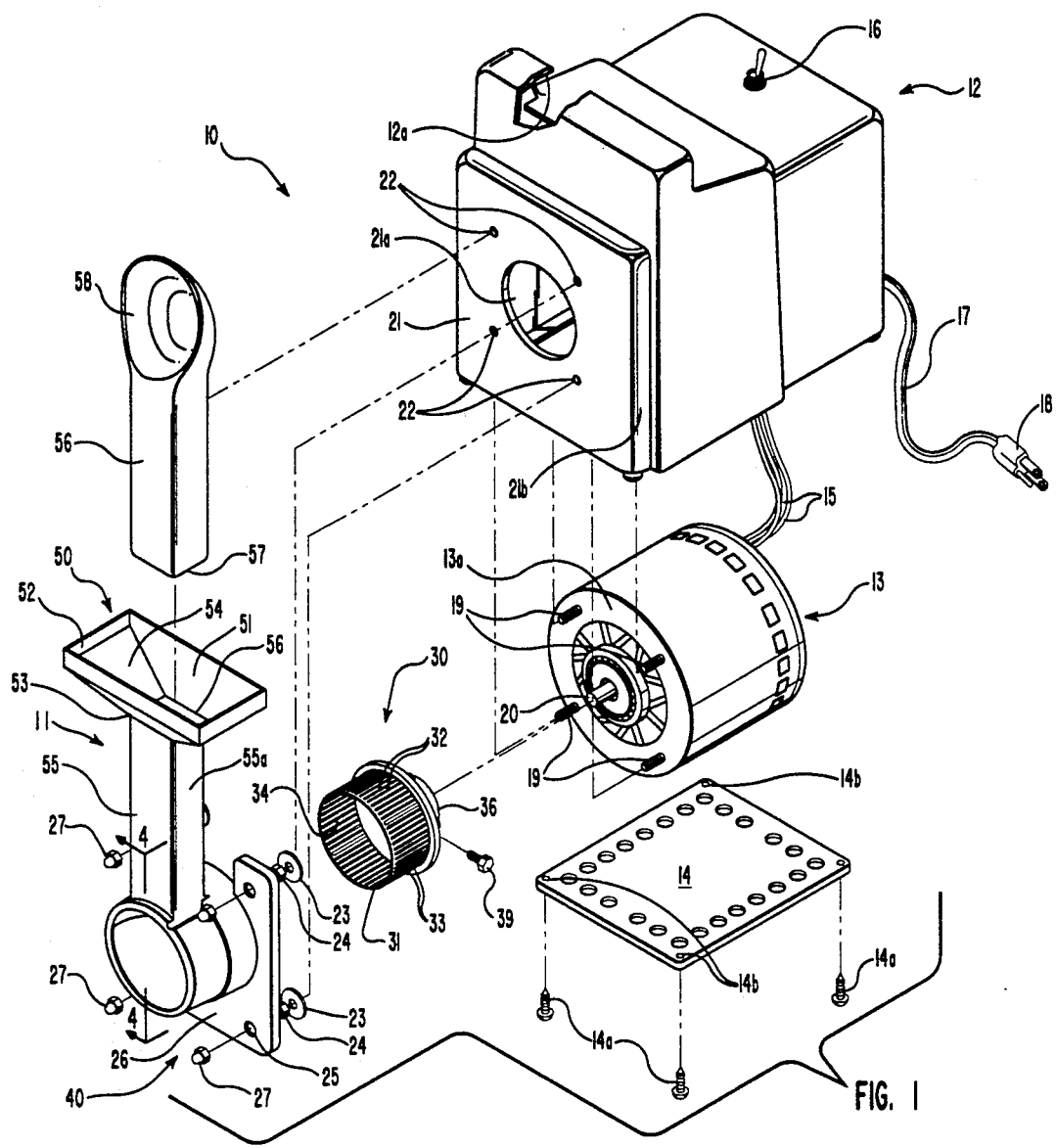
FIG. 1 is an exploded perspective view, taken from slightly above and from a forward end of a portable snow cone maker of the invention showing the components of the invention.
Fig. 1A is a section taken along the line 1A—1A of a ring shaped ice shaving blade of FIG. 1.
FIG. 2 is an enlarged frontal perspective view of a forward end of a discharge chute end shown broken away from a chute component of the invention.
Figure 4:
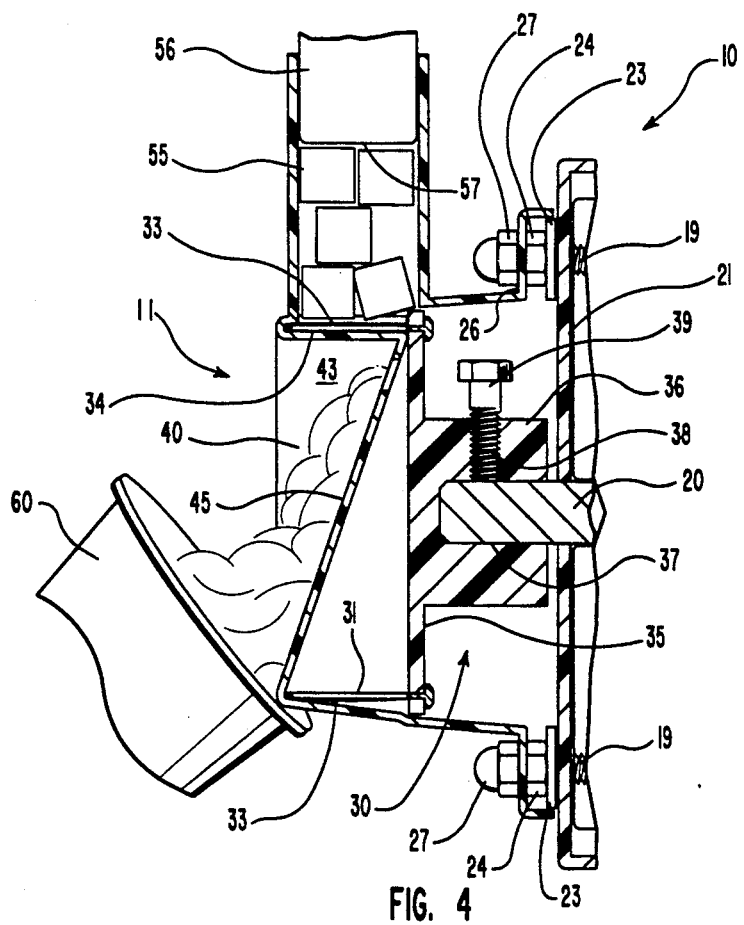

FIG. 4, is a profile sectional view taken along the line 4—4 of FIG. 1, of the assembled snow cone maker of the invention showing ice cubes in the chute being urged by a plunger against the turning ring shaped ice shaving blade, showing ice shaved off from the ice cube passing through blade slots and is scraped off the blade under surface by a scraper slot of the discharge chute that is then directed by a discharge chute sloping face into a cup type receptacle that is positioned below the face lower end.

DETAILED DESCRIPTION OF THE INVENTION

Referring now to the drawings:

In the illustrated preferred embodiment, the invention in a portable snow cone maker, hereinafter referred to a maker, is shown generally at 10, exploded into its components and a hopper and chute 11 is shown assembled to a forward end of the maker 10, shown in FIG. 4. The maker 10, in addition to the hopper and chute 11, includes a housing 12 wherein is fitted an electric motor 13, with a base plate 14 for arrangement across the open bottom of the housing. The electric motor is shown as having a cylindrical body and is preferably a small motor of approximately ¼ horse power. Electric motor 13 is shown connected through wires 15 and a switch 16 to an electrical cord 17 and is connected to a source of electrical power by a plug 18 end. A flat forward face 13a of electric motor 13 is shown as mounting bolts 19 that extend at right or normal angles therefrom and are radially equidistant from one another at equal radial intervals relative to the motor drive shaft 20 and extend at right or normal angles from the motor forward face. As shown in FIG. 1 and assembled view of FIG. 4, the bolts 19 are fitted through openings 22 formed through a mounting plate 21 that is a forward face of the housing 12, the mounting plat including a center opening for accommodating the electric motor drive shaft 20 fitted therethrough. For maintaining the electric motor 12 to the mounting face, washers 23 and nuts 24, as shown best in FIG. 4, are fitted and turned over the bolt 19 ends. After which electric motor mounting, the base plate 14 can be secured across the housing 12 bottom by fitting screws 14a through holes 14b formed through the base plate corner that are turned into holes formed in the housing 12 bottom, at the corners of a bottom opening therein. Bolts 19, as shown, also provide for mounting the hopper and chute 11 with a discharge chute 40, completing the maker 10. For connecting the hopper and chute 11 and connected discharge chute 40 to the housing 12 and electric motor 13, the bolts 19 are fitted through holes 25 formed through a mounting flange 26 of the discharge chute 40, and cap nuts 27 are turned thereover.

As set out above assembly of the housing 12, electric motor 13 and hopper and chute 11 with discharge chute together requires fitting of the components together over bolts 19 and turning nuts 24 and 27 thereover. Prior to fitting the hopper and chute 11 at discharge chute 40 onto bolts 19, an ice shaving blade 30 is mounted to the electric motor drive shaft 20. The ice shaving blade, as shown best in FIG. 1 and in the ice shaving blade section of FIG. 1A, hereinafter referred to as blade, is a thin belt of a metal material 31 that is curved upon itself and is connected at its ends into a cylinder. The blade is laterally slotted at 32 at equal spaced intervals therearound leaving juxtapositioned slot edges that are parallel to one another. The slot edges, respectively, are forward and rear edges relative to the direction of blade turning, with the rear slot edge bent upwardly into a scoop 33 for shaving ice off a surface of a block of ice urged thereagainst. In operation, turning the blade 31 scoops 33 over an ice surface produces shavings that pass through the slots 32 and fall from and collect on the undersurface 34 of blade 31. The collected ice shavings are then scraped off the blade undersurface by a wiper 41 of the discharge chute 40, as shown best in FIG. 3, which shavings travel along and out of the discharge chute 40 into a receptacle, as set out hereinbelow.

The ice shaving blade 30 the blade 31 is mounted to extend at a right angle outwardly from around an edge of a flat forward surface of a disk 35, and a collar 36 is mounted to the center of a rear disk surface wherein a hole 37 is formed to receive, as shown in FIG. 4, the electric motor drive shaft 20 slid thereon. For maintaining the drive shaft secured in the collar hole 37, a threaded hole 38 is formed through the collar 36 side to intersect the hole 37, and a bolt 39 is turned in threaded hole 38 to engage and lock the collar 36 onto drive shaft 20. So arranged, drive shaft 20 turns the disk 35 and blade 31 secured thereto.

The hopper and chute 11 with the discharge chute 40 is preferably formed, as a single unit, by molding methods from a plastic material such as polyethylene, manufactured by Quantum Chemical. Shown best in FIG. 1, the hopper and chute 11 with discharge chute 40 include a hopper 50 that includes a flat back wall 51 with the top edge thereof connecting to a lip sections 52 that are outstanding therefrom, the back wall and lip sections forming a vertical rectangular fence as the hopper opening. From the lower edge of which lip sections inwardly sloping flat front and side walls, 53 and 54, respectively extend downwardly. The back and front walls 51 and 53 and side walls 54 lower edges form an upper end 56 of a connected chute 55 that is for receiving ice cubes, as shown best in FIG. 4, dropped therein as set out later herein. The chute 55 may have a square or rectangular cross section and is preferably uniform along its length for passing cubes of ice freely therethrough.

The discharge chute 40 is secured to the lower chute 55 end, with ice cubes passed therethrough contacting the top surface of the blade 31, as shown best in FIG. 4. The ice cubes are preferable urged by a straight plunger 56, that is formed to fit and slide within the chute 55, the plunger lower end 57 pressing against the top of a column of ice cubes forcing the lower cube or cubes against the blade 31 top surface. For providing a force directed through the plunger 56 to urge the column of ice cubes against the blade 31, the plunger top end includes a hand gripping or engaging arrangement, that is preferably, as shown in FIG. 1, an ice cube scoop 58. With the plunger 56 removed, an operator can hold the plunger and scoop ice cubes with the scoop 58 from a container of ice cubes and pour them into the hopper 50. Whereafter, the plunger is reversed, and the lower end 57 fitted into the chute. An operator, gripping the ice cube scoop 58, then urges the ice cubes against the blade 31. When the blade 31 is turned, the blade outwardly extending scoops 33 each remove ice shavings from the contacting ice cube or cubes surface. The ice shavings passing through the blade slots 32 and into the discharge chute 40.

As its name indicates, the discharge chute 40 is for discharging the shaved ice passed through the blade 31 slots 32 into a receptacle, such as the cup 60, as shown best in FIG. 4. The discharge chute 40, shown best in FIG. 3, includes the described mounting flange 26 for fitting over the electric motor mounting plate 21, with an outstanding lip 42 extending outwardly from around the edge of which mounting flange 26 for fitting over the edges 21b of which mounting plate 21. A wall 43 is formed as a cylinder extending from the inner surface of the mounting flange 26 outwardly at a right angle.

Figure 3:
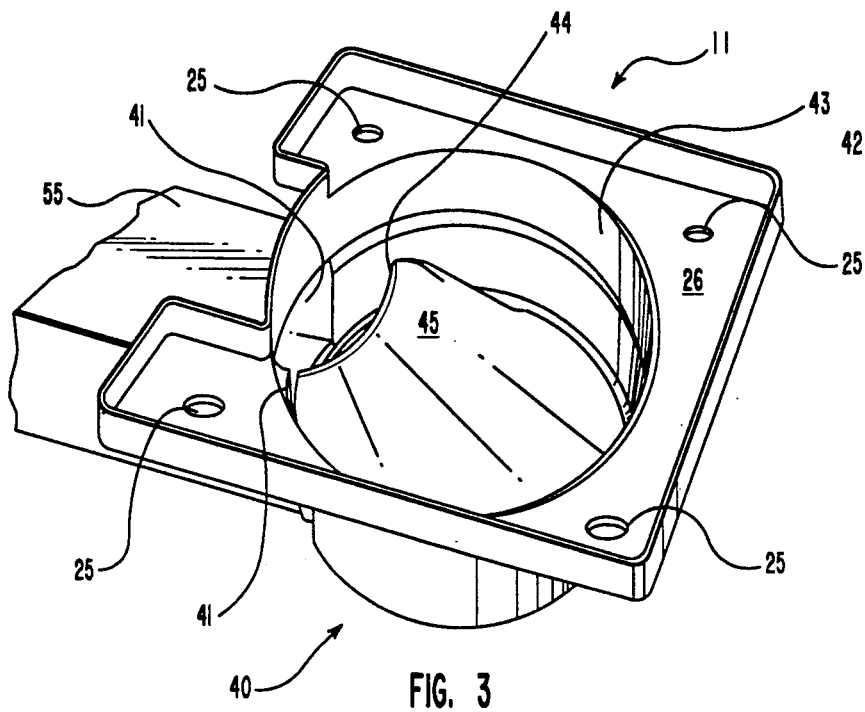
FIG. 3, is a rear perspective view of the discharge chute end of FIG. 2.

With the maker 10 assembled as shown in FIG. 4, the blade 31 turns within the discharge chute alongside wall 43, passing through a slot 44, across the chute 55 lower end and through wiper slot 41, as shown best in FIG. 3. The wiper slot 41 is proximate to the undersurface of the blade 31, and just below side 55a of chute 55 such that ice shavings that pass through the blade slots 32 are scraped off the blade undersurface at 41 and flow along a curved discharge surface 45. The discharge surface 45 rear surface is shown in FIGS. 2 and 3 illustrating the concave curve of the discharge surface forward face wherealong the shaved ice travels to flow into the cup 60, shown in FIG. 4. Which concave discharge surface 45 extends from immediately below the wiper slot 41 at a uniform arc of approximately one hundred eighty (180) degrees plus or minus ten (10) degrees, to immediately below the slot 44, which slot 44 is off set from the chute 55 side above wiper slot 41 by approximately one hundred twenty (120) degrees of arc plus or minus ten (10) degrees, that is opposite to the direction of blade 31 turning, providing a uniformly curved discharge surface 45 that is accordingly canted approximately ninety (90) degrees from the closest chute 55 side that is opposite to the direction of blade 31 turning, for providing a curling action to a stream of ice shavings has are passed through the blade 31 slots 32. Which ice shavings that are scraped off the blade undersurface by the wiper slot 41, that collect on and travel along the discharge surface 45 in a column that curls as it passes along the discharge surface to drop into cup 60, as shown in FIG. 4. A syrup topping can then be poured over the ice shavings in cup 60 providing a refreshing confectionery that can be spooned into a consumers mouth. Should ice shavings travel behind the discharge surface 45 and melt, the melted ice shaving will drain out of drain opening 46, as shown in FIG. 2.

Although a preferred form of my invention has been shown and disclosed herein, it is to be understood that the present disclosure is made by way of example and that variations are possible without departing from the subject matter coming within the scope of the following claims and a reasonable equivalency thereof, which subject matter I regard as my invention.

I claim:

1. A portable snow cone maker comprising, a housing formed to contain an electric motor and includes a mounting plate means formed as a forward face; an electric motor with wiring means for connection to a source of electrical power, said electric motor having a plurality of studs extending at spaced intervals from a forward end of said electric motor wherefrom a drive shaft extends, said studs and drive shaft for fitting through holes in said housing mounting plate means and said studs for receiving nut means turned thereover; an ice shaving blade means and means for mounting said ice shaving blade means onto and for turning at a right angle to said drive shaft; and a combination hopper, wherein ice cubes are dumped, a straight open ice cube chute for receiving ice cubes from said hopper and passing them therethrough, and a dispensing chute that receives the ice cubes through a top thereof, said dispenser chute including a mounting flange means for receiving and mounting to said electric motor studs said blade means fitting into and turning within said dispenser chute, which said discharge chute includes an outstanding cylindrical wall arranged alongside said blade means wherethrough aligned slots are formed wherethrough said blade means pass such that said blade means top surface is opposite to said chute lower end, and one of said slots provides also for wiping ice shaving off from said blade means undersurface, and said discharge chute has an inner surface formed thereacross that guides ice shavings off from said blade undersurface out of said discharge chute and into a vessel positioned therebelow.

2. A portable snow cone maker as recited in claim 1, wherein the mounting plate means is a flat plate formed as the housing front face with the stud receiving holes formed therethrough at equal spaced intervals radially from a center opening wherethrough the electric motor drive shaft is fitted; and said housing top surface, adjacent to said mounting plate means, is folded thereacross to form a handle for gripping by an operator to lift the snow cone maker.

3. A portable snow cone maker as recited in claim 1, wherein the means for mounting the ice shaving blade means onto the drive shaft is a flat disk from a forward face of which said disk forward face said blade means is mounted to extend outwardly at a right angle, and a collar means extends from the center of a rear face of said disk for coupling to said drive shaft.

4. A portable snow cone maker as recited in claim 1, wherein the ice shaving blade means is a thin metal band that is connected at its ends into a cylinder and is slotted at spaced intervals thereacross around its entire circumference, with the edge of each slot opposite to the direction of turning of said band elevated to form a scoop, which said scoop is for removing a shaving off from a surface of an ice cube and directing that shaving through an adjacent slot when said band is moved thereover.

5. A portable snow cone maker as recited in claim 1, wherein the combination hopper, chute and discharge chute are formed as a single unit that is arranged for attachment to the ends of the stud means, nesting the blade means within said discharge chute such that said blade means turns beneath a lower end of said chute; opposing slots formed in said discharge chute for accommodating said blade means fitted therein such that said chute lower end is positioned between said slots; and said discharge chute includes a face that slopes outwardly from the opposing slots to a lower end whereon ice shavings from the blade means travel to fall from said discharge chute.

6. A portable snow cone maker as recited in claim 5, wherein the discharge chute slot into which the blade means turns is a scraper means for scrapping ice shaving off from said blade means undersurface and directing said shavings onto the discharge chute sloping face and is directly below a downstream or in the direction of blade means turning side of the chute lower end; and said discharge chute sloping face is uniformly curved from the wiper slot to the other slot that is spaced apart upstream or opposite to the direction of blade means turning from said chute other upstream or opposite to the direction of blade means turning side, providing a valley to said sloping face for collecting the ice shavings into a column that slides down and off of said face.

7. A portable snow cone maker as recited in claim 6, wherein the discharge chute sloping face is a uniform concave curve between the scraper slot and the other slot, which said other slot is at an arc of approximately one hundred twenty (120) degrees plus or minus ten (10) degrees to the direction of blade means turning to the upstream chute side.

8. A portable snow cone maker as recited in claim 1, further including a plunger for fitting through the hopper and into the chute for use for urging ice cubes in said chute into contact with the top surface of the blade means.

9. A portable snow cone maker as recited in claim 8, further including a cup means formed on a top end of the plunger for gripping by an operator and for use in scooping ice cubes into the hopper.

* * * * *